Aug. 16, 1966 J. L. SANBORN 3,267,268

SUPERCONDUCTIVE BINARY FULL ADDERS

Filed Dec. 26, 1961

INVENTOR
JERE L. SANBORN
BY Stephen J. Limanek
ATTORNEY

United States Patent Office 3,267,268

Patented August 16, 1966

3,267,268

SUPERCONDUCTIVE BINARY FULL ADDERS

Jere L. Sanborn, Poughkeepsie, N.Y., assignor to International Business Machines Corporation, New York, N.Y., a corporation of New York Filed Dec. 26, 1961, Ser. No. 162,115

5 Claims. (Cl. 235—175)

This invention relates to superconductive circuits and more particularly to superconductive binary full adders.

Advances in the cryogenic art have been described in U.S. Patent 2,832,897 issued to D. A. Buck on April 29, 1958, wherein various gating or bistable circuits utilizing superconductive materials have been described. The basic superconductive switching element is referred to as a cryotron which includes a first conductor made of superconductive material, called a gate conductor, and a second conductor disposed in the proximity of the first conductor for applying a magnetic field to the first or gate conductor. The second conductor is a control conductor of the cryotron. The cryotron is operated at a superconductive temperature such that the gate conductor has a resistance of zero ohms at a given magnetic field intensity. Current flow of at least a predetermined magnitude, known as the critical control current, through the control conductor produces a critical magnetic field at the gate conductor of an intensity higher than the given intensity sufficient to destroy or quench the superconductivity of the gate conductor and, thus, place the gate conductor in a resistive condition at the operating superconductive temperature. The control conductor is generally fabricated of a superconductive material requiring a higher critical magnetic field intensity than that of the gate conductor to maintain the control conductor in its superconducting condition for all magnetic field intensities encountered in the operation of the circuit in which it is used. Through the interconnection of the gate and control conductors of a number of cryotrons, various amplifiers, oscillators and logical circuits have been designed which feature reliable low cost, small size electrical circuits.

In an article entitled "The Cryotron—a Superconductive Computer Component" by D. A. Buck in Proceedings of the IRE, April 1956, pages 482–493, there is disclosed an interconnection of a large number of cryotrons of the type described hereinabove to form a binary adder. In a commonly assigned copending application having Serial No. 774,667, filed November 8, 1958, by James B. Mackay, now Patent No. 3,053,451, there is disclosed another binary adder utilizing a number of cryotrons each having a single control conductor or winding in which control currents are combined to perform logical operations.

Adder circuits for electronic data computers should be reliable as well as fast operating and of a small size. Thus, to improve the prior art adders of the type shown in the Buck article it would be desirable to reduce the number of cryotrons in the Buck adder to a minimum without sacrificing reliability. It has been found that when currents are combined they initially split in inverse ratio to the inductance of the separate lines. Thus, full current is not realized immediately and, therefore, a delay is encountered in the circuit until it becomes stabilized.

It is an object of this invention to provide improved superconductive circuits.

Another object of this invention is to provide improved superconductive adders.

A further object of this invention is to provide improved superconductive binary full adder circuits.

Still another object of this invention is to provide improved superconductive adders which utilize cryotrons having a plurality of control conductors.

Still a further object of this invention is to provide improved superconductive full adders utilizing a minimum number of cryotrons.

Yet another object of this invention is to provide improved superconductive full adders which operate at faster speeds than do prior art superconductive adders.

In accordance with the present invention a binary adder is provided which includes a carry circuit having a plurality of cryotrons, each cryotron having a plurality of control conductors connected to signal input lines and a sum circuit having a plurality of cryotrons, each cryotron having a plurality of control conductors connected to the signal input lines and to the output of the carry circuit.

An important advantage of this invention is that a binary full adder is provided which is of a compact size and faster in operation than prior art superconductive adders.

An important feature of this invention is that the adder requires current sources of only one size feeding into a minimum number of cryotrons.

The foregoing and other objects, features and advantages of the invention will be apparent from the following more particular description of preferred embodiments of the invention, as illustrated in the accompanying drawing.

Figure 1:
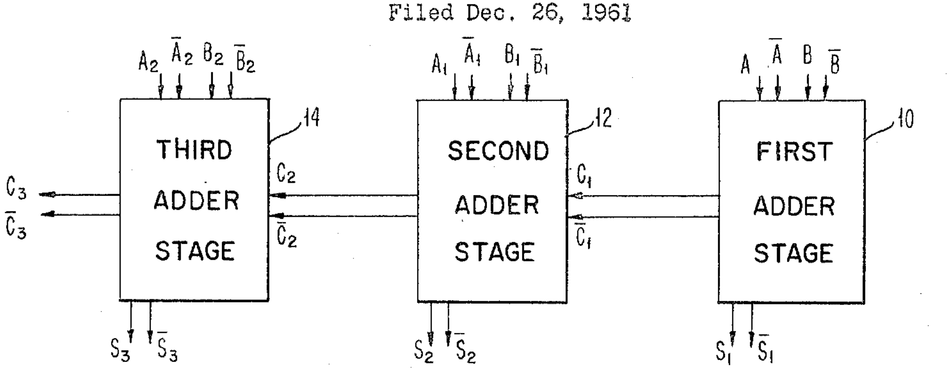
FIG. 1 illustrates in block form three stages of a binary full adder.

Referring to the drawing in more detail, there is shown in FIG. 1 a binary full adder having a first stage 10, a second stage 12 and a third stage 14. The first stage 10 is provided with a first pair of input lines A, $\overline{A}$ for applying a first signal, which may be indicative of a digit of an augend, to the first stage 10 and a second pair of input lines B, $\overline{B}$ for applying a second signal, which may be indicative of a digit of an addend, to the first stage 10. A signal, indicative of the sum of the augend and addend digits, is produced by the first stage at a first pair of output lines $S_1$, $\overline{S}_1$ and a signal, indicative of the carry resulting from the addition of the first and second signals, is produced by the first stage 10 at a second pair of output lines $C_1$, $\overline{C}_1$. The second stage 12 is provided with first and second pairs of input lines $A_1$, $\overline{A}_1$ and $B_1$, $\overline{B}_1$ for applying first and second signals, respectively, indicative of augend and addend digits of an order higher than that of the first and second signals applied to the first stage 10, to the second stage. A sum signal is produced by the second stage 12 at a first pair of output lines $S_2$, $\overline{S}_2$ and a carry signal is produced by the second stage 12 at a second pair of output lines $C_2$, $\overline{C}_2$. The third stage 12 is provided with first and second pairs of input lines $A_2$, $\overline{A}_2$ and $B_2$, $\overline{B}_2$ for applying first and second signals, respectively, indicative of the augend and addend digits of an order higher than that of the first and second signals applied to the second stage 10, to the third stage. A sum signal is produced by the third stage at a first pair of output lines $S_3$, $\overline{S}_3$ and a carry signal is produced by the third stage 14 at a second pair of output lines $C_3$, $\overline{C}_3$. The output lines $C_1$, $\overline{C}_1$ from the first stage 10 are connected to the second stage 12 for applying the carry signal from the first stage 10 to the second stage 12 as a third input signal for the second stage 12. The output lines $C_2$, $\overline{C}_2$ from the second stage 12 are connected to the third stage 14 for applying the carry signal from the second stage 12 to the third stage 14 as a third input signal for the third stage 14. The carry lines $C_3$, $\overline{C}_3$ of the third stage 14 may be applied to additional higher stages (not shown) or to any suitable utilizing device. Each of the first and second pair of input lines of the first, second and third stages 10, 12 and 14 may receive signals from a suitable signal source (not shown) which is provided with two output leads for each signal as, for example, the trigger source described in the above mentioned U.S. patent application. The construction of these triggers is such that each trigger is effective to direct a current pulse to a given one of the output leads when it is applying a binary input of "1" to the adder and to direct a current pulse to the other lead when it is applying a binary input of "0" to the adder. Accordingly, in the circuits illustrated in the drawing it will be understood that when the binary signal "1" is being applied to any one pair of the input lines A, $\overline{A}$, B, $\overline{B}$, $A_1$, $\overline{A}_1$, $B_1$, $\overline{B}_1$, $A_2$, $\overline{A}_2$ or $B_2$, $\overline{B}_2$ the current pulse is applied to the A, B, $A_1$, $B_1$, $A_2$, or $B_2$ line of the corresponding pair of lines and no current is passing through the other line of that pair. When a "0" signal is applied to any of the stages 10, 12 or 14 the current pulse will be applied to $\overline{A}$, $\overline{B}$, $\overline{A}_1$, $\overline{B}_1$, $\overline{A}_2$ or $\overline{B}_2$ line of the corresponding pair of lines and no current is passing through the other line of that pair. The trigger sources may be known cryotron steering or flip-flop circuits.

Figure 2:
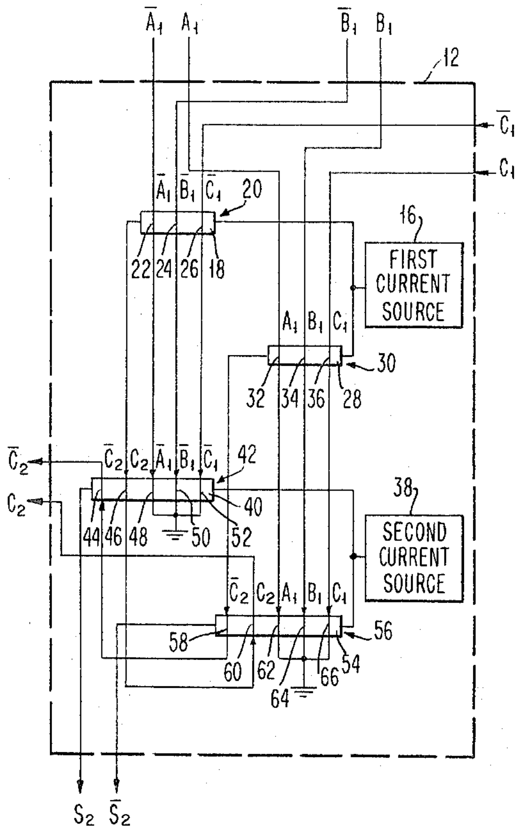
FIG. 2 shows a circuit which may be used in any one of the stages of the adder illustrated in FIG. 1.

An embodiment of a circuit of the present invention which may be used in each of the stages 10, 12 and 14 of the adder of FIG. 1 is shown in FIG. 2 of the drawing. Although the circuit shown in FIG. 2 may be used in each of the stages 10, 12 and 14 of the adder of FIG. 1 it first will be described more particularly as being the circuit of the second stage 12.

The circuit of FIG. 2 includes a first current source 16 connected to a gate conductor 18 of a cryotron 20 which has first, second and third control conductors 22, 24 and 26 and to a gate conductor 28 of a second cryotron 30 having first, second and third control conductors 32, 34 and 36, the two gate conductors 18 and 28 being further connected in parallel relationship to each other.

A second current source 38 is connected to a gate conductor 40 of a third cryotron 42 having first, second, third, fourth and fifth control conductors 44, 46, 48, 50 and 52 and to a gate conductor 54 of a fourth cryotron 56 having first, second, third, fourth and fifth control conductors 58, 60, 62, 64 and 66, the two gate conductors 40 and 54 being further connected in parallel relationship to each other. The first control conductor 22 of the first cryotron 20 is serially connected with the third control conductor 48 of the third cryotron 42 to a super conductive ground, the second control conductor 24 of the first cryotron 20 is serially connected with the fourth control conductor 50 of the third cryotron 42 to the superconductive ground and the third control conductor 26 of the first cryotron 20 is serially connected with the fifth control conductor 52 of the third cryotron 42 to the superconductive ground. The terminal of the gate conductor 18 of the first cryotron 20 remote from the first current source 16 is connected through the second control conductor 46 of the third cryotron 42 and the second control conductor 60 of the fourth cryotron 56, which are serially interconnected, to the carry output line $C_2$. The first control conductor 32 of the second cryotron 30 is serially interconnected with the third control conductor 62 of the fourth cryotron 56 to the superconductive ground, the second control conductor 34 of the second cryotron 30 is serially connected with the fourth control conductor 64 of the fourth cryotron 56 to the superconductive ground and the third control conductor 36 of the second cryotron 30 is serially connected with the fifth control conductor 66 of the fourth cryotron 56 to the superconductive ground. The terminal of the gate conductor 28 of the second cryotron 30 remote from the first current source 16 is connected through the first control conductor 58 of the fourth cryotron 56 and the first control conductor 44 of the third cryotron 42, which are serially interconnected, to the carry output line $\overline{C}_2$. The terminal of the gate conductor 40 of the third cryotron 42 remote from the second current source 38 is connected to the sum output line $S_2$ and the terminal of the gate conductor 54 of the fourth cryotron 56 remote from the second current source 38 is connected to the sum output line $\overline{S}_2$. The $\overline{A}_1$ input line is connected to the first control conductor 22 of the first cryotron 20 and the $A_1$ input line is connected to the first control conductor 32 of the second cryotron 30. The $\overline{B}_1$ input line is connected to the second control conductor 24 of the first cryotron 20 and the $B_1$ line is connected to the second control conductor 34 of the second cryotron 30. The $\overline{C}_1$ line from the first stage 10 of the adder shown in FIG. 1 is connected to the third control conductor 26 of the first cryotron 20 and the $C_1$ line from the first stage 10 is connected to the third control conductor 36 of the second cryotron 30. The circuit is designed so that currents passing through the first, second and third control conductors 22, 24 and 26 of the first cryotron 20 produce magnetic fields at the gate conductor 18 thereof which are in the same direction and the currents passing through the first, second and third control conductors 32, 34 and 36 of the second cryotron produce magnetic fields having a similar direction. Current pulses passing through the second, third, fourth and fifth control conductors 46, 48, 50 and 52 of the third cryotron 42 produce magnetic fields in a given direction and current through the first control conductor 44 produces a magnetic field which tends to oppose the magnetic fields produced in any of the other control conductors of cryotron 42. Current pulses passing through the first, third, fourth and fifth control conductors 58, 62, 64 and 66 of the fourth cryotron 56 produce magnetic fields in the same direction and current passing through the second control conductor 60 produces a magnetic field which tends to oppose the magnetic field produced by the other control conductors of cryotron 56.

The circuit is further designed so that each control conductor of a cryotron carries one unit of current which produces a magnetic field to the corresponding gate conductor of unit intensity. When a net current of more than one unit, say, two units, producing a net field intensity of two units is passing through the control conductors of a cryotron, the gate conductor of that cryotron becomes resistive.

In the operation of the circuit shown in FIG. 2 it can be seen that when binary signals are applied to the circuit from the three pairs of input lines A, $\overline{A}$, B, $\overline{B}$ and C, $\overline{C}$, logical binary sum and carry signals are produced at the sum output pair of lines $S_2$, $\overline{S}_2$ and the carry output pair of lines $C_2$, $\overline{C}_2$, respectively. For example, when an augend "0" digit at the first pair of input lines $A_1$, $\overline{A}_1$, an addend "0" at the second pair of input lines $B_1$, $\overline{B}_1$ and a "0" carry at the carry lines $C_1$, $\overline{C}_1$ are to be added signals are produced at the sum pair of lines $S_2$, $\overline{S}_2$ and at the carry pair of lines $C_2$, $\overline{C}_2$. When three "0" signals are to be added the three "0" signals are represented by a current pulse in each of the input lines $\overline{A}_1$, $\overline{B}_1$ and $\overline{C}_1$ and no current in the lines $A_1$, $B_1$, and $C_1$. Thus, the gate conductors 18 and 40 of the first cryotron 20 and third cryotron 42, respectively, become resistive since more than two units of current are passing through the control conductors of each of these cryotrons 20, 42, while the gate conductors 28 and 54 of the second cryotron 30 and the fourth cryotron 56 remain superconductive, carrying all of the current from the first current source 16 and the second current source 38, respectively. Since the carry output on lines $C_2$ and $\overline{C}_2$ is determined by the condition of the majority of the control conductors 22, 24 and 26 of the first cryotron 20 and by the majority of the control conductors 32, 34 and 36 of the second cryotron 30, the output line $\overline{C}_2$ will contain an output current pulse while the carry output line $C_2$ will not contain a current pulse, indicating a "0" binary digit at the carry output of the second stage 12. Current pulses are also flowing through the third, fourth and fifth control conductors 48, 50 and 52 of the third cryotron 42 in one direction and the current passing through the first control conductor 44 is flowing in an opposite direction, therefore, the net control current in the third cryotron 42 is equal to the two units to render the gate conductor 40 of the third cryotron 42 resistive. A net current of only one unit is passing through the control conductors of the fourth cryotron 56 since current is passing through only the first control conductor 58 of the fourth cryotron 56 and, therefore, the gate conductor 54 of the fourth cryotron 56 remains in a superconductive condition passing all of the current from the second current source to the $\overline{S}$ output line to indicate a "0" sum at the sum output lines $S_2$, $\overline{S}_2$.

If a "0" signal at input lines $A_1$, $\overline{A}_1$, a "0" signal at $B_1$, $\overline{B}_1$ and a "1" signal at $C_1$, $\overline{C}_1$ are to be added it can be seen that only one current pulse will pass through the control conductors of the cryotron 30, that two current pulses will pass through the control conductors of the second cryotron 20, that a net control current of one pulse will pass through the third cryotron 42 and that a net control current of two pulses will pass through the fourth cryotron 56. Accordingly, the gate conductor 18 of the first cryotron becomes resistive while the gate conductor 28 of the second cryotron 30 remains in a superconductive state to provide a current pulse at the $\overline{C}_2$ output line and to prevent a current pulse from being produced at the $C_2$ output line. Since a current pulse is passing in one direction through the third and fourth control conductors 48 and 50 and in the opposite direction through the first control conductor 44 of the third cryotron 42 the net control current for the third cryotron 42 is equal to one unit. A current pulse is flowing in the same direction through the first and fifth control conductors 58 and 66 of the fourth cryotron 56 and, therefore, the net control current for the fourth cryotron is two units. Thus, a current pulse from the second current source 38 is applied to the $S_2$ output line through the superconductive gate conductor 40 of cryotron 42 while the resistive condition of the gate conductor 54 of the fourth cryotron 56 prevents a current pulse from being applied to the output line $\overline{S}_2$ to indicate a "1" binary digit at the sum output of the second stage 12. The binary signals at the sum output and carry output lines of the circuit of FIG. 2 for the various possible input conditions is indicated in the following table in which the first and second rows represent the conditions for adding "0"+"0"+"0" and for adding "0"+"0"+"1," respectively.

In the above table, the input conditions indicate the input line of each of the three pairs of input lines which is carrying the unit current and $I_{42}$ and $I_{56}$ indicate the number of units of net current passing through the control conductors of cryotron 42 and cryotron 56, respectively.

Figure 3:
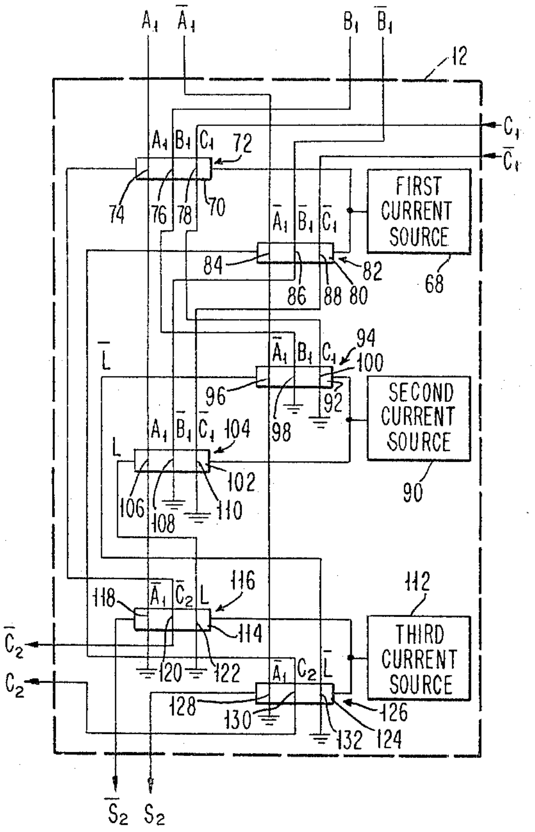
FIG. 3 shows a modification of the circuit shown in FIG. 2 of the drawing.

Another embodiment of a circuit of the present invention which may be used for each of the stages 10, 12 and 14 of the adder of FIG. 1 is shown in FIG. 3 of the drawing. This circuit is provided with six cryotrons, which may be ordinary majority cryotrons, whereas the circuit illustrated in FIG. 2 requires only four cryotrons. However, each of the cryotrons in FIG. 3 requires only three control conductors whereas each of two cryotrons in the circuit of FIG. 2 requires five control conductors. The circuit of FIG. 3 has the advantage of a faster operating time in producing the carry output, due largely to a reduction in the number of control conductors connected to the source producing the carry current. The circuit of FIG. 3, like the circuit of FIG. 2 will first be described as being the circuit of the second stage 12 although it should be understood that this circuit may be used in each of the stages 10, 12 and 14 of the adder.

The circuit of FIG. 3 includes a first current source 68 which is connected to a gate conductor 70 of a first cryotron 72 having first, second and third control conductors 74, 76, 78 and to a gate conductor 80 of a second cryotron 82 having first, second and third control conductors 84, 86 and 88, the two gate conductors 70, 80 being further connected in parallel relationship to each other. A second current source 90 is connected to a gate conductor 92 of a third cryotron 94 having first, second and third control conductors 96, 98, 100 and to a gate conductor 102 of a fourth cryotron 104 having first, second and third control conductors 106, 108 and 110, the two gate conductors 92, 102 being further connected in parallel relationship to each other. A third current source 112 is connected to a gate conductor 114 of a fifth cryotron 116 which has first, second and third control conductors 118, 120, 122 and to a gate conductor 124 of a sixth cryotron 126 having first, second and third control conductors 128, 130 and 132, the two gate conductors 114, 124 also being connected in parallel relationship to each other. The terminal of the gate conductor 70 of the first cryotron 72 remote from the first current source 68 is connected to the $\overline{C}_2$ carry output line through the second control conductor 120 of the fifth cryotron 116. The terminal of the gate conductor 80 of the second cryotron 82 remote from the first current source 68 is connected through the second control conductor 130 of the sixth cryotron 126 to the carry output line $C_2$. The terminal of the gate conductor 92 of the third cryotron 94 remote from the second current source 90 is connected to a superconductive ground through a line identified as $\overline{L}$, and then through the third control conductor 132 of the sixth cryotron 126 and the terminal

| Input Conditions | Input Currents | | | | | | Carry Outputs | | Sum Outputs | | Net Control Current | |
|---|---|---|---|---|---|---|---|---|---|---|---|---|
| | $A_1$ | $\overline{A}_1$ | $B_1$ | $\overline{B}_1$ | $C_1$ | $\overline{C}_1$ | $C_2$ | $\overline{C}_2$ | $S_2$ | $\overline{S}_2$ | $I_{42}$ | $I_{56}$ |
| $\overline{A}\,\overline{B}\,\overline{C}$ | 0 | 1 | 0 | 1 | 0 | 1 | 0 | 1 | 0 | 1 | 2 | 1 |
| $\overline{A}\,\overline{B}\,C$ | 0 | 1 | 0 | 1 | 1 | 0 | 0 | 1 | 1 | 0 | 1 | 2 |
| $\overline{A}\,B\,\overline{C}$ | 0 | 1 | 1 | 0 | 0 | 1 | 0 | 1 | 1 | 0 | 1 | 2 |
| $A\,\overline{B}\,\overline{C}$ | 1 | 0 | 0 | 1 | 0 | 1 | 0 | 1 | 1 | 0 | 1 | 2 |
| $\overline{A}\,B\,C$ | 0 | 1 | 1 | 0 | 1 | 0 | 1 | 0 | 0 | 1 | 2 | 1 |
| $A\,\overline{B}\,C$ | 1 | 0 | 0 | 1 | 1 | 0 | 1 | 0 | 0 | 1 | 2 | 1 |
| $A\,B\,\overline{C}$ | 1 | 0 | 1 | 0 | 0 | 1 | 1 | 0 | 0 | 1 | 2 | 1 |
| $A\,B\,C$ | 1 | 0 | 1 | 0 | 1 | 0 | 1 | 0 | 1 | 0 | 1 | 2 |

of the gate conductor 102 of the fourth cryotron 104 remote from the second current source 90 is connected to the superconductive ground through a line identified as L and then through the third control conductor 122 of the fifth cryotron 116. The terminal of the gate conductor 114 of the fifth cryotron 116 remote from the third current source 112 is connected to the sum output line $\overline{S}_2$ and the terminal of the gate conductor 124 of the cryotron 126 remote from the third current source 112 is connected to the sum output line $S_2$. The line $A_1$ of the first pair of input lines $A_1$, $\overline{A}_1$ is connected through serially interconnected first control conductors 74, 106 and 118 of the first, fourth and fifth cryotrons 72, 104 and 116 to the superconductive ground and the $\overline{A}_1$ line of the first pair of lines $A_1$, $\overline{A}_1$ is connected through serially interconnected first control conductors 84, 96 and 128 of the second, third and sixth cryotrons 82, 94 and 126. The $B_1$ line of the second pair of input lines $B_1$, $\overline{B}_1$ is connected through serially interconnected second control conductors 76 and 98 of the first and third cryotrons 72 and 94, to the superconductive ground and the $\overline{B}_1$ line of the second input pair of lines $B_1$, $\overline{B}_1$ is connected through serially interconnected second control conductors 86 and 108 of the second and fourth cryotrons 82 and 104 to the superconductive ground. The line $C_1$ of the carry pair of input line $C_1$, $\overline{C}_1$ is connected through serially interconnected third control conductors 78 and 100 of the first and third cryotrons 72 and 94 to the superconductive ground and the $\overline{C}_1$ line of the carry pair of input lines $C_1$, $\overline{C}_1$ is connected through serially interconnected third control conductors 88 and 110 of the second and fourth cryotrons 82 and 104 to the superconductive ground. In the circuit of FIG. 3 currents pass through all of the control conductors of each cryotron in the same direction with respect to the corresponding gate conductor and each of the cryotrons of the circuit in FIG. 3 are designed so that each gate conductor becomes resistive when a unit of current is passing through at least two of the corresponding control conductors of the cryotron, as do the gate conductors of the cryotrons in the circuit of FIG. 2 of the drawing.

In the operation of the circuit shown in FIG. 3 it can be seen that when binary signals are applied to the circuit from the three pairs of input lines $A_1$, $\overline{A}_1$, $B_1$, $\overline{B}_1$, and $C_1$, $\overline{C}_1$, logical binary sum and carry signals are produced at the sum output pair of lines $S_2$, $\overline{S}_2$ and the carry output pair of lines $C_2$, $\overline{C}_2$, respectively. For example, when "0" signals at each of the three pairs of input lines $A_1$, $\overline{A}_1$, $B_1$, $\overline{B}_1$ and $C_1$, $\overline{C}_1$, are to be added, a current pulse is applied to the circuit from the $\overline{A}_1$, $\overline{B}_1$ and $\overline{C}_1$ lines, with no current passing through the lines $A_1$, $B_1$ and $C_1$. Thus, a "0" carry signal is provided at the carry pair of output lines $C_2$, $\overline{C}_2$ with a current pulse in the $\overline{C}_2$ line and no current flowing in the $C_2$ line since the three control conductors 84, 86 and 88 of the second cryotron 82 are applying a magnetic field of three units to the gate conductor 80 of the second cryotron 82 to render this gate conductor 80 resistive, while no current is passing through the control conductors 74, 76 and 78 of the first cryotron 72. One unit of magnetic field intensity is applied to the gate conductor 92 of the third cryotron 94 and two units of magnetic field intensity is applied to the gate conductor 102 of the fourth cryotron 104 to produce a current pulse in line $\overline{L}$ with no current flowing in line L. Since only the second control conductor 120 of the fifth cryotron 116 is carrying current while the first and third control conductors 128 and 132 of the sixth cryotron 126 are carrying current, a current pulse is applied to the output line $\overline{S}_2$ and no current is applied to the output line $S_2$ to provide a "0" output signal at the sum pair of output lines $S_2$, $\overline{S}_2$.

If "0" signals are applied to the circuit of FIG. 3 by the first and second pair of input lines $A_1$, $\overline{A}_1$, and $B_1$, $\overline{B}_1$, and a "1" signal is applied from the carry input lines $C_1$, $\overline{C}_1$, it can be seen that current passing through the third control conductor 78 of the first cryotron 72 and through the first and second control conductors 86 and 88 of the second cryotron 82 produces current in the $\overline{C}_2$ output line and no current in the $C_2$ output line to provide a "0" output signal at the carry output lines $C_2$, $\overline{C}_2$. Current passing through the first and third control conductors 96 and 100 of the third cryotron 94 and through only the second control conductor 108 of the fourth cryotron 104 produces no current in the $\overline{L}$ line and a current pulse in the L line. Accordingly, the second and third control conductors 120 and 122 of the fifth cryotron 116 produce magnetic fields which quench the superconductivity of the gate conductor 114 of the fifth cryotron 116 while the magnetic field produced by the current in the first control conductor 128 of the sixth cryotron 126 is insufficient to affect the superconductivity of the gate conductor 124 of the sixth cryotron 126 to provide a current pulse in only the $S_2$ line of the sum output line $S_2$, $\overline{S}_2$ to indicate a "1" sum signal.

The binary signals at the sum and carry output lines of the circuit of FIG. 3 for the various possible input conditions is indicated in the above table presented in connection with the description of the circuit of FIG. 2 of the drawing. Since the cryotrons 42 and 56 are peculiar only to the circuit of FIG. 2, the last two columns of the table which are identified as Net Control Current are not pertinent to the circuit of FIG. 3 of the drawing and, thus, should be ignored when considering this latter circuit.

As stated hereinabove the circuits shown in FIGS. 2 and 3 of the drawing have been described as being circuits of the second stage 12 of the adder illustrated in FIG. 1 of the drawing but that these circuits may also be used in the other stages of the adder of the invention. When either of these two circuits are used in the third stage 14 of the adder of FIG. 1 for producing a sum and carry signal of one order higher than the order of the sum and carry signals produced at the output lines $S_2$ $\overline{S}_2$ and $C_2$, $\overline{C}_2$, respectively, of the second stage 12, it is only necessary to replace the three pairs of input lines $A_1$, $\overline{A}_1$, $B_1$, $\overline{B}_1$, and $C_1$, $\overline{C}_1$ shown in FIGS. 2 and 3 with the three pairs of input lines $A_2$, $\overline{A}_2$, $B_2$, $\overline{B}_2$ and $C_2$, $\overline{C}_2$ indicated at the third stage 14 of the adder of FIG. 1 of the drawing. The operation of the circuit of the third stage 14 for producing the sum and carry signals at the output lines $S_3$, $\overline{S}_3$ and $C_3$, $\overline{C}_3$ is similar to the operation of the circuit of the second stage 12 of FIG. 1 for producing the sum and carry signals at the output lines $S_2$, $\overline{S}_2$ and $C_2$, $\overline{C}_2$.

The first stage 10 of the adder of FIG. 1 of the drawing is used to add the lowest order digits of an augend and an addend, for example, the units digits, and, therefore, this stage 10 does not require means for adding binary carry signals to the augend and addend other than to utilize the means 3 for applying effectively a "0" carry signal from the carry input lines $C_1$, $\overline{C}_1$. More specifically, when the circuits of FIGS. 2 or 3 are used in the first stage 10 of the adder of FIG. 1, the circuit connections from the carry input line $C_1$ to the superconductive ground may be totally eliminated, and only a constant current of unit strength need be supplied from the carry input line $\overline{C}_1$ to the third control conductor 88 of the second cryotron 82 and to the third control conductor 110 of the fourth cryotron 104.

Accordingly, it can be seen that the present invention provides an improved adder circuit having a minimum number of cryotrons without the need of combining currents to produce desired logical functions at speeds which are faster than those heretofore obtained in prior art superconductive adder circuits.

While the invention has been particularly shown and described with reference to preferred embodiments thereof, it will be understood by those skilled in the art that various changes in form and details may be made therein without departing from the spirit and scope of the invention.

What is claimed is:

1. An adder circuit comprising:

(a) a first pair of cryotrons each having a gate conductor and first, second and third control conductors, the gate conductors of said first pair of cryotrons being connected in parallel relationship, (b) a first current source coupled to the gate conductors of said first pair of cryotrons, (c) a second pair of cryotrons each having a gate conductor and first, second, third, fourth and fifth control conductors, the gate conductors of said second pair of cryotrons being connected in parallel relationship with respect to each other, (d) a second current source coupled to the gate conductors of said second pair of cryotrons, (e) means for coupling the first, second and third control conductors of one of said first pair of cryotrons to the first, second and third control conductors, respectively, of one of said second pair of cryotrons, (f) means for coupling the first, second and third control conductors of the other cryotron of said first pair of cryotrons to the first, second and third control conductors, respectively, of the other cryotron of said second pair of cryotrons, (g) means for coupling the gate conductor of said one cryotron of said first pair of cryotrons to the fourth control conductor of each cryotron of said second pair of cryotrons, (h) means for coupling the gate conductor of said other cryotron of said first pair of cryotrons to the fifth control conductor of each cryotron of said second pair of cryotrons and (i) means for applying input signals to the first, second and third control conductors of each of said cryotrons, said gate conductor coupling means being arranged so that current passing through the fifth conductor of said one cryotron of said second pair of cryotrons produces a magnetic field tending to oppose the magnetic field produced by current passing through the other control conductors of said one cryotron of said second pair of cryotrons and so that current passing through the fourth control conductor of said other cryotron of said second pair of cryotrons produces a magnetic field tending to oppose the magnetic field produced by current passing through the other control conductors of said other cryotron of said second pair of cryotrons, whereby the output of the gate conductors of said first pair of cryotrons produces a carry signal and the output of the gate conductors of said second pair of cryotrons produces a sum signal.

2. An adder circuit comprising:

(a) first and second cryotrons each having a gate conductor and first, second and third control conductors, (b) a first current source coupled to one terminal of each of said gate conductors, (c) third and fourth cryotrons each having a gate conductor and first, second, third, fourth and fifth control conductors, (d) a second current source coupled to one terminal of the gate conductors of said third and fourth cryotrons, (e) first, second and third pairs of input lines, (f) first and second pairs of output lines, (g) means for connecting one line of said first pair of input lines through said first conductor of said first and third cryotrons to a superconductive ground, (h) means for connecting the other line of said first pair of input lines through the first control conductor of said second and fourth cryotrons to the superconductive ground, (i) means for connecting one line of said second pair of input lines through the second control conductor of said first and third cryotrons to the superconductive ground, (j) means for connecting the other line of said second pair of input lines through the second control conductor of said second and fourth cryotrons to the superconductive ground, (k) means for connecting one line of said third pair of input lines through the third control conductor of said first and third cryotrons to the superconductive ground, (l) means for coupling the other line of said third pair of input lines through the third control conductor of said second and fourth cryotrons to the superconductive ground, (m) means for connecting the other terminal of the gate conductor of said first cryotron through the fourth control conductor of each of said third and fourth cryotrons to one line of said first pair of output lines, (n) means for coupling the other terminal of the gate conductor of said second cryotron through the fifth conductor of each of said fifth and fourth cryotrons to the other line of said first pair of output lines and (o) means for coupling the other terminal of the gate conductor of each of the third and fourth cryotrons to first and second lines, respectively, of said second pair of output lines, said first cryotron other terminal coupling means being arranged so that current passing through the fourth control conductor of said fourth cryotron produces a magnetic field tending to oppose the magnetic field produced by current passing through the other control conductors of said fourth cryotron and said second cryotron other terminal coupling means being arranged so that the fifth control conductor of said third cryotron passes current producing a magnetic field tending to oppose the magnetic field produced by the current passing through the other control conductors of said third cryotron.

3. An adder circuit comprising:

(a) first, second, third, fourth, fifth and sixth cryotrons each having a gate conductor and three control conductors, (b) a first current source, the gate conductors of said first and second cryotrons being connected in parallel relationship to each other and coupled to said first current source, (c) a second current source, the gate conductors of said third and fourth cryotrons being connected in parallel relationship with respect to each other and coupled to said second current source, (d) a third current source, the gate conductors of said fifth and sixth cryotrons being connected in parallel relationship with respect to each other and coupled to said third current source, (e) means for coupling at least one of the three control conductors of said first cryotron to at least one control conductor of said third, fourth and fifth cryotrons, (f) means for coupling at least one of the three control conductors of said second cryotrons to at least one control conductor of said third, fourth and sixth cryotrons, (g) means for coupling the gate conductor of said first cryotron to another of the control conductors of said fifth cryotron, (h) means for coupling the gate conductor of said second cryotron to another of the control conductors of said sixth cryotron, (i) means for coupling the gate conductor of said third cryotron to the remaining control conductor of said sixth cryotron, (j) means for coupling the gate conductor of said fourth cryotron to the remaining control conductor of said fifth cryotron and (k) means for applying input signals to the three control conductors of said first and second cryotrons.

4. An adder circuit comprising:

(a) first, second, third, fourth, fifth and sixth cryotrons each having a gate conductor and first, second and third control conductors, (b) a first current source connected to one terminal of the gate conductor of each of said first and second cryotrons, (c) a second current source connected to the gate conductor of each of said third and fourth cryotrons, (d) a third current source connected to the gate conductor of each of said fifth and sixth cryotrons, (e) means for serially interconnecting the first conductor of each of said first, fourth and fifth cryotrons, (f) means for serially interconnecting the first control conductor of each of said second, third and sixth cryotrons, (g) means for serially interconnecting the second control conductors of each of said first and third cryotrons, (h) means for serially interconnecting the third control conductors of each of said first and third cryotrons, (i) means for serially interconnecting the second control conductor of each of said second and fourth cryotrons, (j) means for serially interconnecting the third control conductor of each of said second and fourth cryotrons, (k) means for coupling the other terminal of the gate conductor of said first cryotron to the second control conductor of said fifth cryotron, (l) means for coupling the other terminal of the gate conductor of said second cryotron to the second control conductor of said sixth cryotron, (m) means for coupling the other terminal of the gate conductor of said third cryotron to the third control conductor of said sixth cryotron, (n) means for coupling the other terminal of the gate conductor of said fourth cryotron to the third control conductor of said fifth cryotron and (o) means for applying input signals to the first, second and third control conductors of said first and second cryotrons.

5. An adder circuit comprising:

(A) means for producing a carry signal including (a) a first current source, (b) a first cryotron having first, second and third control conductors and a gate conductor having a terminal connected to said first current source, (c) a second cryotron having first, second and third control conductors and a gate conductor having a terminal connected to said first current source, (d) first, second and third pairs of input lines, (e) means for connecting one line of said first pair of input lines to the first control conductor of said first cryotron and for connecting the other line of said first pair of input lines to the first control conductor of said second cryotron, (f) means for connecting one line of said second pair of input lines to the second control conductor of the first cryotron and for connecting the other line of said second pair of input lines to the second control conductor of the second cryotron and (g) means for connecting one line of said third pair of input lines to the third control conductor of the first cryotron and for connecting the other line of said third pair of input lines to the third control conductor of said second cryotron, whereby a carry signal is produced at the other terminal of the gate conductors of said first and second cryotrons, (B) means for producing an intermediate signal including (h) a second current source, (i) a third cryotron having first, second and third control conductors and a gate conductor having a terminal connected to said second current source, (j) a fourth cryotron having first, second and third conductors and a gate conductor having a terminal connected to said second current source, (k) means for connecting the first control conductor of said third cryotron to the first control conductor of said second cryotron and for connecting said second and third control conductors of said third cryotron to said second and third control conductors, respectively, of said first cryotron and (l) means for connecting the first control conductor of said fourth cryotron to the first control conductor of said first cryotron and for connecting the second and third control conductors of said fourth cryotron to the second and third control conductors, respectively, of said second cryotron, whereby an intermediate signal is produced at the other terminal of the gate conductors of said third and fourth cryotrons and (C) means for producing a sum output signal including (m) a third current source, (n) a fifth cryotron having first, second and third control conductors and a gate conductor having a terminal connected to said third current source, (o) a sixth cryotron having first, second and third control conductors and a gate conductor having a terminal connected to said third current source, (p) means for connecting the first, second and third control conductors of the fifth cryotron to the first control conductor of the fourth cryotron, the other terminal of the gate conductor of the first cryotron and the other terminal of the gate conductor of the fourth cryotron, respectively, and (q) means for connecting the first, second and third control conductors of the sixth cryotron to the first control conductor of the third cryotron, the other terminal of the gate conductor of the second cryotron and the other terminal of the gate conductor of the third cryotron, respectively, whereby a sum signal is produced at the other terminal of the gate conductors of said fifth and sixth cryotrons.

References Cited by the Examiner

UNITED STATES PATENTS

| | | | |
|---|---|---|---|
| 3,011,711 | 12/1961 | Buck | 235—176 |
| 3,053,451 | 9/1962 | Mackay | 235—175 |

MALCOLM A. MORRISON, *Primary Examiner.*

S. SIMON, *Assistant Examiner.*